United States Patent [19]

Duello

[11] Patent Number: 5,085,100
[45] Date of Patent: Feb. 4, 1992

[54] GEAR SHROUDING SYSTEM

[75] Inventor: Charles L. Duello, Arlington, Tex.

[73] Assignee: Bell Helicopter Textron Inc., Fort Worth, Tex.

[21] Appl. No.: 645,234

[22] Filed: Jan. 24, 1991

Related U.S. Application Data

[63] Continuation-in-part of Ser. No. 423,767, Oct. 18, 1989.

[51] Int. Cl.[5] .................. F16H 57/04; F16H 57/02
[52] U.S. Cl. ................................. 74/606 R; 74/467
[58] Field of Search ............... 74/606 R, 607, 467; 220/373

[56] References Cited

U.S. PATENT DOCUMENTS

| | | | |
|---|---|---|---|
| 4,347,759 | 9/1982 | Renk et al. | 74/606 R |
| 4,470,324 | 9/1984 | Renk et al. | 74/606 R |
| 4,896,561 | 1/1990 | Hayakawa et al. | 74/606 R |
| 4,970,913 | 11/1990 | Kielar et al. | 74/606 R |

Primary Examiner—Vinh T. Luong
Attorney, Agent, or Firm—Ross, Howison, Clapp & Korn

[57] ABSTRACT

A shroud (20) for a gear train (12) disposed within a gear case (22) includes a plurality of meshing gears (14), each gear (14) having sides (14a, 14b), teeth (16) and an outer diameter (14c). The shroud (20) encircles the outer diameter (14c) of each gear (14) within the gear train (12) and for enclosing the sides (14a, 14b) adjacent to the outer diameter (14c) of each gear (14) within the gear train (12). The shroud (20) includes a pair of side walls (20a, 20b) and an end wall (20c). The walls (20a, 20b, 20c) enclosed the teeth (16) of each of the gears (14) within the gear train (12) for substantially minimizing cooling fluid present within the gear case (22) from contacting the gear train (12).

5 Claims, 4 Drawing Sheets

GEAR SHROUDING SYSTEM

This invention was made with Government support under N00019-85-C-0145 awarded by Department of the Navy, Naval Air Systems Command. The Government has certain rights in this invention.

Related Application

This application is a continuation-in-part of U.S. patent application Ser. No. 07/423,767, filed Oct. 18, 1989, and entitled "Gear Shrouding System".

BACKGROUND OF THE INVENTION

1. Technical Field of the Invention

The present invention relates to a shrouding system for a high speed gear train, and more particularly, to a system for minimizing gear windage and churning power losses within a gear train.

2. Description of the Prior Art

High speed gear trains generate a substantial amount of heat due to windage and churning of the gears resulting in significant power losses of the gear train. Gear related power losses are due in part to windage currents pumped by the gears and the churning of oil between meshing gears within the gear train. The desirability to minimize the weight of components, especially in aircraft environments, results in gear trains operating at higher speeds thereby increasing windage losses. Windage losses typically increase as a cube function of gear speed. Therefore, power losses particularly in gear trains of aircraft continue to be a problem.

Shrouding of the gear train, or portions thereof, has been proposed to reduce gear churning losses. Typically, a large clearance is utilized between the gear and shroud, and the gear may extend below the cooling fluid level. Churning losses have also been reduced through the reduction in the amount of oil or cooling fluid flow to the gears. However, even if a low rate is reached where the oil flow is sufficient to cool the gears, power losses within the gear train are still unacceptably high. Other methods for the dissipation of heat within the gear train result in further power losses. Therefore, a need has thus risen for a shrouding system for a high speed gear train for the minimization of gear windage and churning power losses. A need has further arisen for a shrouding system for the efficient circulation of cooling fluid around the gears within a gear train.

SUMMARY OF THE INVENTION

In accordance with one aspect of the present invention, in a high speed gear train including a plurality of meshing gears, each gear having sides, tips and an outer diameter, a shroud is provided. The shroud includes a pair of side walls disposed opposite the sides of each gear and adjacent to the gear outer diameter. An end wall is disposed perpendicularly to the pair of side walls and is disposed parallel to the gear outer diameter, such that the shroud side walls and end wall substantially enclose the tips of each of the plurality of gears within the gear train.

In accordance with another aspect of the present invention, a shroud for a gear train is provided. The gear train includes a plurality of meshing gears, each gear having sides, tips and an outer diameter. The shroud includes a generally U-shaped curvilinear enclosure for encircling the outer diameter of each gear within the gear train and for enclosing the sides adjacent to the outer diameter of each gear within the gear train.

Brief Description of the Drawings

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
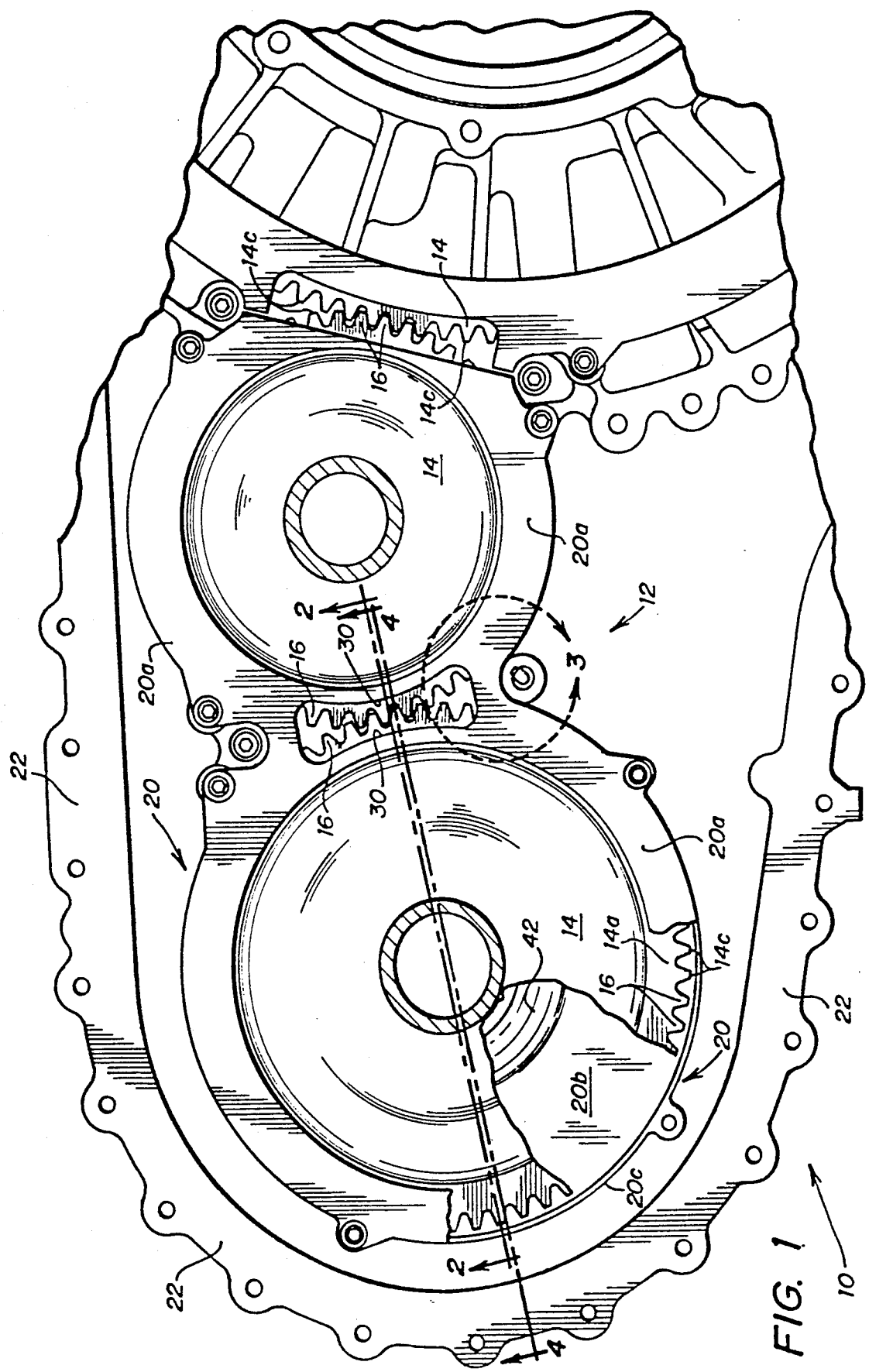
FIG. 1 is a bottom plan view of a portion of a gear train, partially broken, to illustrate the present gear shrouding system.
Figure 2:
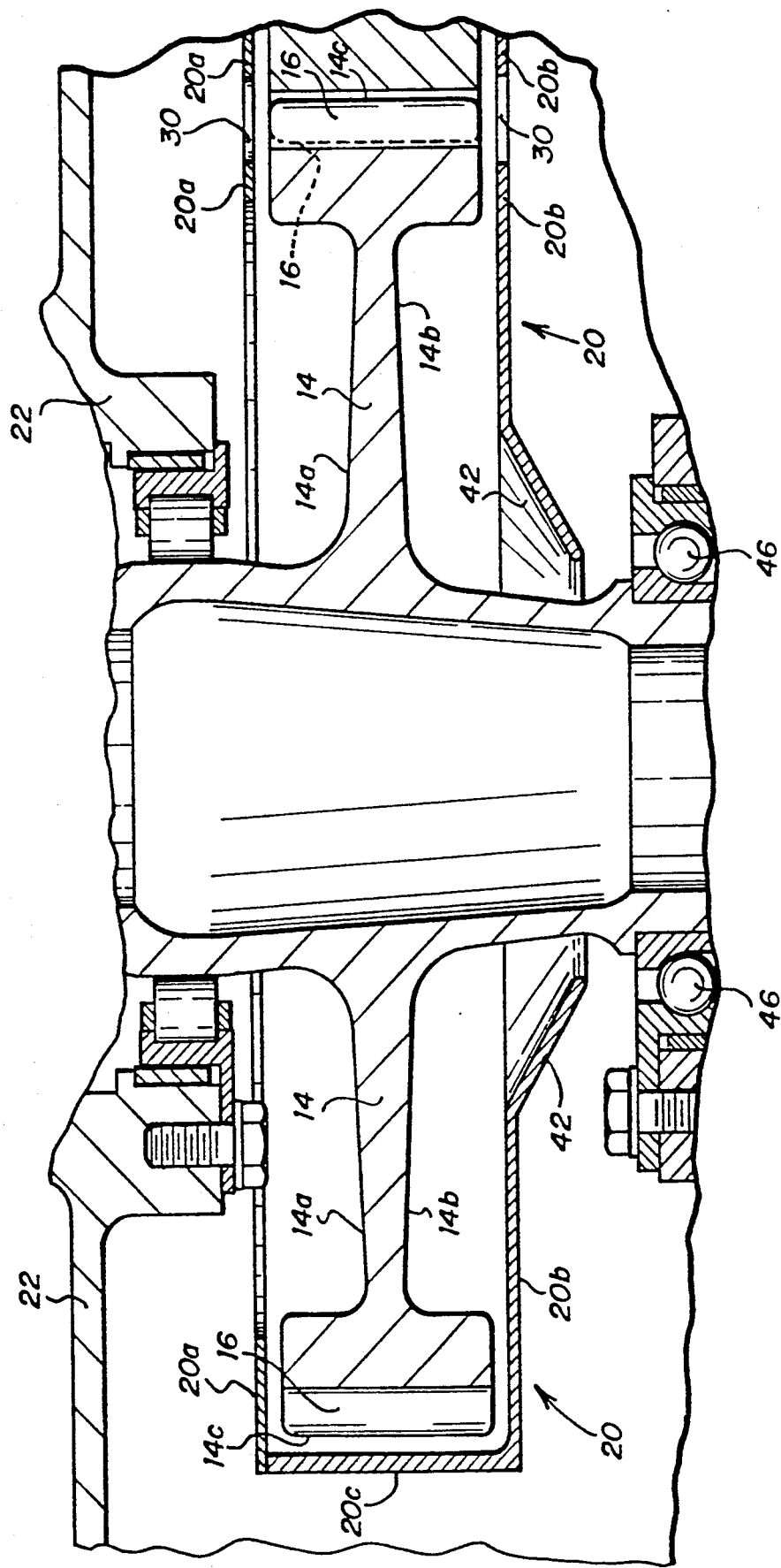
FIG. 2 is a sectional view taken generally along section lines 2—2 of FIG. 1 illustrating the present gear shrouding system.
Figure 3:
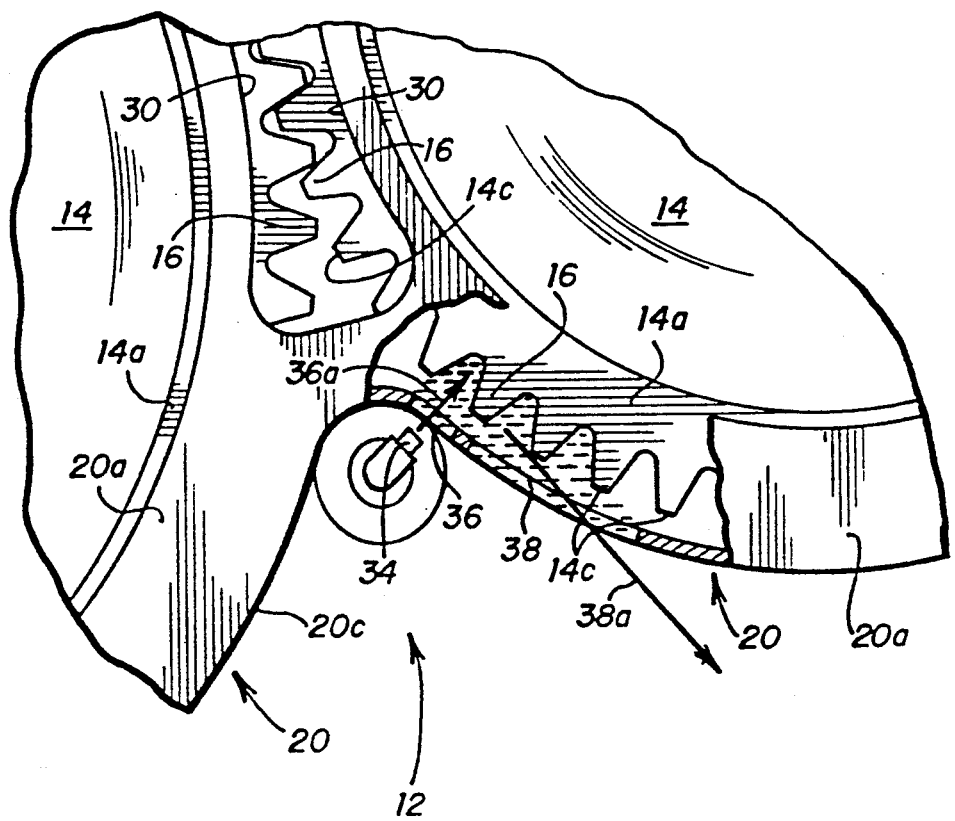
FIG. 3 is an enlarged plan view of a portion of the gear train shown in FIG. 1 illustrating the cooling fluid injection and ejection ports.
Figure 4:
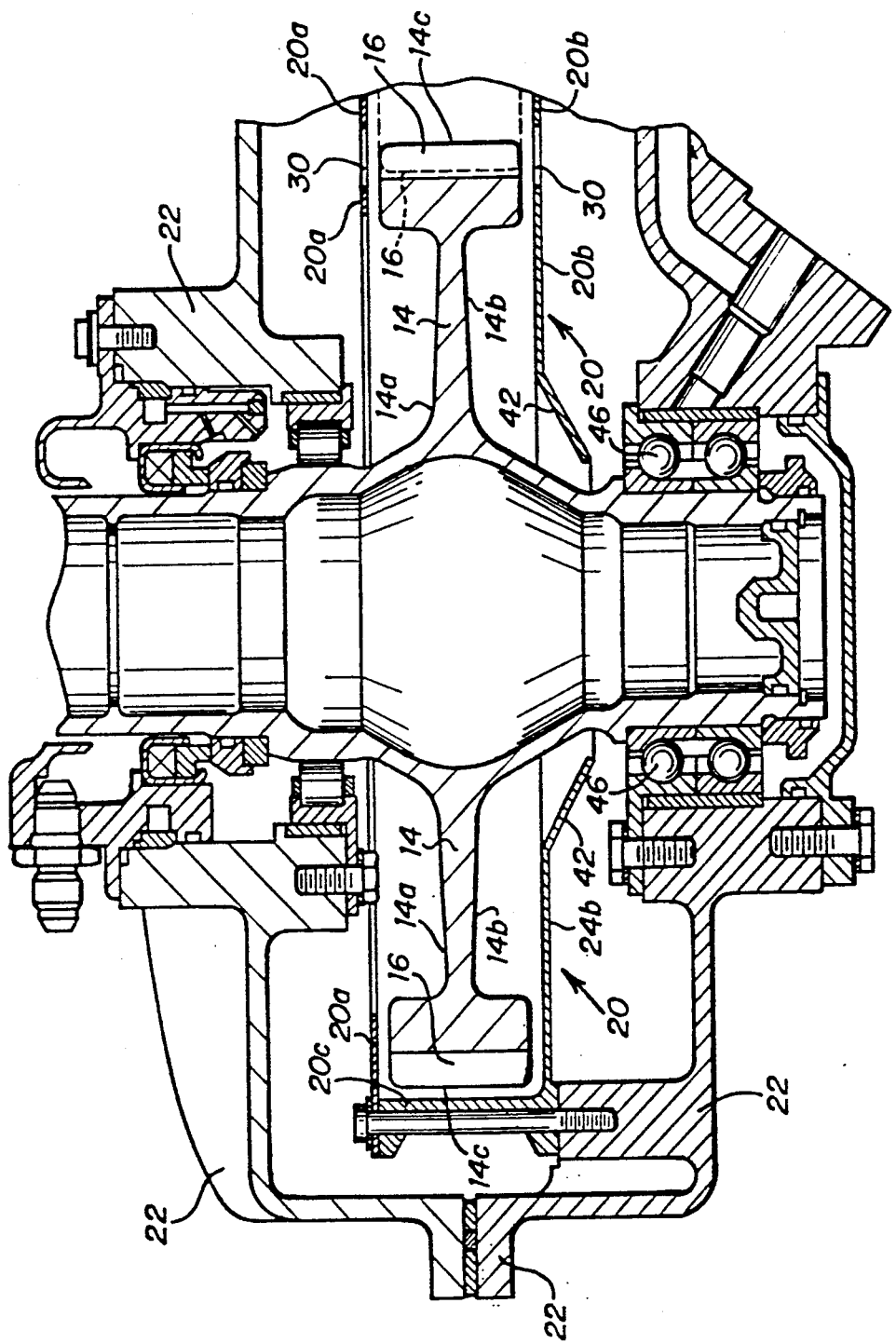
FIG. 4 is a sectional view taken generally along section lines 4—4 of FIG. 1 illustrating the present gear shrouding system.

Referring simultaneously to FIGS. 1, 2, 3, and 4 wherein like numerals are utilized for like and corresponding components throughout, the present gear shrouding system is illustrated, and is generally identified by the numeral 10. Gear shrouding system 10 may be utilized with a high speed gear train, a portion of which is illustrated in the FIGURES by the numeral 12. Gear train 12 includes a plurality of gears 14. Although the FIGURES illustrate two such gears and a portion of a third gear, it will be understood that the present gear shrouding system 10 can be utilized with any number of gears 14 comprising gear train 12. Gear 14 includes sides 14a and 14b in addition to an outer diameter identified by the reference numeral 14c. Gears 14 further include gear teeth 16.

An important aspect of the present gear shrouding system 10 is a shroud 20 which encircles and covers the entire outer diameter of all gears 14 within gear train 12. Shroud 20 is disposed approximately 0.075 inches from teeth 16 of gears 14 to thereby minimize air currents caused by the centrifugal pumping action of gears 14 thereby resulting in less power loss. The complete enclosure by shroud 20 of all gears 14 further prevents re-impingement and minimizes churning of cooling fluid within gear train 12 further reducing power losses. Shroud 20 encircles and encloses both sides 14a and 14b of gears 14 as well as the outer diameter 14c. Shroud 20 is enclosed within a gear case 22.

Shroud 20 includes sides 20a and 20b which are disposed generally parallel to sides 14a and 14b, respectively of gears 14. Shroud 20 further includes an end wall 20c which is disposed generally perpendicular to sides 20a and 20b, and lies parallel to outer diameter 14c of gears 14. Shroud 20 therefore comprises a generally U-shaped enclosure for enclosing teeth 16 of gears 14 within gear train 12. Shroud 20 forms a continuous enclosure within gear case 22 around all gears 14 within gear train 12. The spacing between side walls 20a of shroud 20 and sides 14a of gear 14 as well as the spacing between side 20b of shroud 20 and sides 14b of gears 14 is approximately 0.075 inches (0.190 cm). The spacing between outer diameter 14c of gears 14 and end wall 20c of shroud 20 is also approximately 0.075 inches (0.190 cm).

Disposed within side walls 20a and 20b of shroud 20 is a port 30. Port 30 is disposed in the general area where gears 14 mesh. Port 30 allows for the free intake and discharge of air and cooling fluid due to the meshing pumping action that occurs between gears 14. The positive displacement caused by the meshing action of air and cooling fluid is therefore unrestricted in the area over which gears 14 mesh.

Gear train 12 is cooled and lubricated by a cooling fluid, such as for example, oil which must be delivered to gears 14. In accordance with the present invention, cooling fluid is injected into shroud 20 via a jet 34 through an injection port 36 located within end wall 20c of shroud 20. Since the cooling capability of the cooling fluid decreases as the cooling fluid remains within shroud 20 and is brought into contact with additional gears 14, the present invention allows for the prompt escape of cooling fluid from shroud 20. Located adjacent to injection port 36 is an ejection port 38 spaced apart from injection port 36 along end wall 20c and tangentially from the point of injection port 36. Therefore, once the cooling fluid has been injected through injection port 36, for the cooling of a gear 14, the cooling fluid is immediately ejected from shroud 20 through ejection port 38 for subsequent collection at scavage points for recirculation through gear train 12. The present cooling fluid delivery system using shroud 20, allows gears 14 to operate in a less dense air atmosphere. By recirculating the cooling fluid through shroud 20, the effectiveness and cooling rate of the cooling fluid is increased thereby reducing the cooling fluid flow to gears 14 to reduce churning losses within gear train 12.

Side 20b of shroud 20 further includes a deflector 42. Deflector 42 operates to create a baffle to prevent cooling fluid which has exited from bearing 46 from impinging upon any of the adjacent gears 14. The cooling fluid after exiting shroud 20, is directed to sumps within gear case 22 where it is pumped out and conditioned prior to being injected onto gears 14.

It therefore can be seen that the present shrouding system provides for a complete enclosure of the sides and outer diameters of the gears within a gear train so that all gears are shrouded. The gear shrouding system of the present invention is disposed in close proximity to each gear of the gear train and thereby minimizes air currents caused by centrifugal pumping action of the gears as well as minimizing reimpingement and churning of cooling fluid to thereby reduce power losses. The cooling fluid delivery system associated with the present shrouding system increases the efficiency of the cooling fluid and prevents cooling fluid from reimpinging on the gears within the gear train. Utilization of the present shrouding system results in significant reduction in windage and churning losses thereby resulting in lower power losses of a gear train.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a high speed gear train including a gear case and a plurality of meshing gears, each gear having sides, teeth and an outer diameter, a shroud being disposed within the gear case the shroud comprising:

a pair of side walls disposed opposite the sides of each gear and adjacent to the gear outer diameter; and an end wall disposed generally perpendicularly to said pair of side walls and being disposed parallel to the gear outer diameter, such that said shroud side walls and end wall substantially enclose the teeth of each of the plurality of gears within the gear train for substantially minimizing cooling fluid present within the gear case from contacting the gear train.

2. The shroud of claim 1 wherein said side wall includes a port adjacent to the area where gears mesh for allowing intake and discharge of cooling fluid and air from the gear train.

3. The shroud of claim 1 wherein the spacing between said side walls of said shroud and the side of a gear in the gear train is approximately 0.075 inches.

4. The shroud of claim 1 wherein the spacing between said end wall of said shroud and the gear teeth of a gear in the gear train is approximately 0.075 inches.

5. The shroud of claim 1 wherein said shroud side wall includes means for deflecting cooling fluid.